United States Patent
Herren et al.

(10) Patent No.: US 6,645,298 B1
(45) Date of Patent: Nov. 11, 2003

(54) ACTIVE SUBSTANCE AND DEVICE FOR THE DEACIDIFICATION OF PRINTED MATTER

(75) Inventors: Christian Herren, Rosshausern (CH); Martin Monkewitz, Lucerne (CH)

(73) Assignee: Ruag Munition, Thun (CH)

( * ) Notice: Subject to any disclaimer, the term of this patent is extended or adjusted under 35 U.S.C. 154(b) by 0 days.

(21) Appl. No.: 09/646,896

(22) PCT Filed: Dec. 16, 1998

(86) PCT No.: PCT/CH98/00540

§ 371 (c)(1), (2), (4) Date: Jan. 5, 2001

(87) PCT Pub. No.: WO99/51818

PCT Pub. Date: Oct. 14, 1999

(30) Foreign Application Priority Data

Apr. 7, 1998 (EP) ............................................. 98201091

(51) Int. Cl.[7] ............................................. B05C 19/00
(52) U.S. Cl. ..................... 118/313; 118/314; 118/315; 118/308; 118/629; 454/296
(58) Field of Search ................................. 118/313, 315, 118/308, 309, 314, 206, 216, 411, 412, 629; 454/284, 309, 313, 296, 289; 427/479

(56) References Cited

U.S. PATENT DOCUMENTS

| | | | |
|---|---|---|---|
| 3,703,353 A | * | 11/1972 | Kusterer, Jr. et al. . 427/255.394 |
| 3,898,356 A | | 8/1975 | Williams et al. |
| 4,522,843 A | | 6/1985 | Kundrot |
| 5,433,827 A | | 7/1995 | Page et al. |
| 5,807,171 A | * | 9/1998 | Felsen .......................... 454/296 |
| 5,827,578 A | * | 10/1998 | Bell ............................ 427/479 |

FOREIGN PATENT DOCUMENTS

| | | |
|---|---|---|
| DE | 41 14 075 | 11/1992 |
| DE | 44 36 635 | 4/1996 |
| GB | 2 142 825 | 1/1985 |

* cited by examiner

Primary Examiner—J. A. Lorengo
Assistant Examiner—Yewebdar T Tadesse
(74) Attorney, Agent, or Firm—Oblon, Spivak, McClelland, Maier & Neustadt, P.C.

(57) ABSTRACT

Modern techniques for manufacturing paper using mechanical wood pulp has lead to a persistent over-acidification of printed manner, and threatens to permanently destroy the same. This over-acidification can be neutralized by using an alkaline active substance whose main component is a salt having a relatively low water affinity. An alkaline deposit can be deposited on the paper by also using said alkaline active substance. A device suited for deacidification using this active substance comprises a case (10) which can be closed. Printed matter which can be fanned out in a stand (1) is treated in said case. The printed matter is treated by introducing the powdered active substance via a screw conveyor (32) into an air stream circulated by a fan (19a), whereby the printed matter is leafed through in order to expose it to the active substance.

26 Claims, 8 Drawing Sheets

ACTIVE SUBSTANCE AND DEVICE FOR THE DEACIDIFICATION OF PRINTED MATTER

TECHNICAL FIELD

The present invention relates to an alkaline, pulverized active substance for the deacidification of printed matter, wherein the active substance is distributed over the printed matter by means of air and a device for the deacidification of printed matter, in particular, printed matter which can be fanned out, such as bound books, by means of air streams laden with alkaline active substances in a receiver having supporting parts for the insertion of printed matter.

BACKGROUND ART

Since the invention of mechanical wood pulp in 1844, all printed matter worldwide has undergone decomposition caused by inherent overacidification. In order to save the cultural wealth stored in billions of documents, numerous experiments have been carried out to deacidify the paper matter.

These experiments can be divided into three groups:
1. Wet treatment
2. Gas treatment
3. Dry treatment with alkaine powder Wet treatment using solutions such as peroxide, etc. has proved to be the most dangerous method of treating valuable documents; the pages become distorted or curl, and in some cases the ink even dissolves and runs. The use of gases such as morpholine vapours, etc. requires the use of a costly vacuum chamber and also increases the cycle time for the treatment. Dry treatment with alkaline powdered substances has often failed owing to the non-uniform application of the powder and the effectiveness of the substance.

One process for the deacidification of printed matter and a substance is known from U.S. Pat. No. 5,433,827. In this process, the pages of books are brought into contact with paper coated with a highly concentrated deacidifying substance and mechanically compressed for several days at a high level of humidity—over 75%, preferably 97% relative humidity. Alkali carbonates and alkaline-earth carbonates and their mixtures are used as the deacidifying substance. An alternative proposal is to dust with calcium or magnesium carbonate the pages to be deacidified. The processes are based on ionic migration of the deacidifying substance and are therefore largely dependent on pressure and humidity. The processes described are also very labour-intensive and take from one day to several weeks to carry out.

Therefore, the primary object of the invention is to provide a fast reacting active substance for the deacidification of printed matter, in particular also bound books. The quality of the paper should be of secondary importance, i.e. the active substance should be as universally usable as possible. It must not damage or alter the printed matter. The active substance must be applied uniformly over the entire surface of the paper and produce the same pH value from the first to the last page of a book.

A device according to the preamble of claim 6 is known (DE-A1-44 36 635) in which books are held by the spine in a vertically arranged holder and circular-section jets laden with active substances move and blow through the individual pages from the bottom upwards. This results in heavy mechanical loading of the pages, which are also not leafed through in a defined manner, i.e. the diffuse circular-section jets do not uniformly charge the pages with active substance.

The device is not suitable for individual pages or plates because the non-uniform application of the active substance has a particularly negative effect.

Accordingly, an improved device is to be provided which is fitted with a receiver and is also able to deacidify bound books, catalogues, brochures, etc. without mechanically impairing or damaging them.

The active substance is distinguished by good adhesion to the surface of the paper and, owing to the residual moisture still present therein, is three-dimensionally distributed over the paper.

The mixture described in claim 2 gives a resulting pH of 9.0 to 9.5, i.e. an alkaline excess is established on the paper, thereby neutralising any further progressing acidification.

An alkaline, pulverized active substance comprising a mixture of at least two dried and organic salts, the anionic parts of the salts having a relatively low acidity constant, in that a salt having relatively low water affinity is the main constituent of the active substance and in that the one further salt has relatively high water affinity wherein the salt having high water affinity is potassium carbonate and the salt having relatively low water affinity is potassium hydrogen carbonate, and wherein the potassium carbonate is present in the active substance in an amount of 7% to 15% by weight and wherein the active substance has an average particle size of 20 micrometers to 30 micrometers and a residual moisture content of less than 20% by weight gives a resulting pH of 9.0 to 9.5, i.e. an alkaline excess is established on the paper, thereby neutralizing any further progressing acidification.

An alkaline, pulverized active substance comprising a mixture of at least two dried and organic salts, the anionic parts of the salts having a relatively low acidity constant, in that a salt having relatively low water affinity is the main constituent of the active substance and in that the one further salt has relatively high water affinity wherein the salt having high water affinity is potassium carbonate and the salt having relatively low water affinity is potassium hydrogen carbonate, and wherein the potassium carbonate is present in the active substance in an amount of 0.1% to 5% by weight and wherein the active substance has an average particle size of 28 micrometers to 35 micrometers and a residual moisture content of less than 15% by weight has proved successful in selectively setting a pH of 8.2 to 8.5 and is used for less stressed documents.

Alternatively, a mixture according to either of the foregoing is used, with the addition of potassium hydrogen phosphate or ammonium thiocyanate is present in the active substance in an amount of 1% to 5% by weight, the resulting pH of which is adjustable in a range from 7.2 to 7.5.

The addition of polystyrene balls increases the flowability and thus the conveyability of the active substance.

Placing the printed matter in the invented device has proved particularly successful, the device leafing through the printed matter and uniformly charging it with active substance by means of a staggered row of flat jets. In the case of bound books, these are inserted into the supporting parts with the spines facing downwards and are gently treated by the device. By means of suitable holding arrangements, however, unbound or non-stitched leaves can also be treated.

Preferably, the receiver for the printed matter is accommodated in a case closable by a hinged cover, thereby avoiding emissions.

The invented device has been found to be advantageous from the point of view of promoting flow when the air diffuser (15) is box-shaped.

It has been found kinematically advantageous, i.e., only reguiring a simple drive, when the aie diffuser (15) of the invented device is arranged in a horizontal plane and is laterally displaceable above the supporting parts (2, 2').

The invented device has been found to be advantageous from the point of view of promoting flow when the air diffuser (15) is box-shaped.

By the use of a fan, the active substance is circulated and thereby used repeatedly.

By the incorporation of a secondary flow with a filter, the device can be emptied of powder and thus opened without problems.

A dehumidifying chamber, which is inserted into a further secondary flow and by means of which the moistness of the applied powder is kept relatively constant, has proved successful. The moisture drawn out of the books during treatment is thereby absorbed.

The recirculation of the secondary flow into the main flow allows particularly simple control of the humidity inside the device.

Feeding the secondary flow in at the powder inlet is advantageous because in this way the powder is first acted upon by dry air and conveyed before it comes into contact with the moister air of the main flow.

In large installations, a thermal dehumidifying and heating system appears advantageous because it permits virtually continuous operation.

Embodiments of the invention will be further described in the following with reference to drawings, in which like reference numerals are used for like functional components:

BEST MODE FOR CARRYING OUT THE INVENTION

Figure 1:
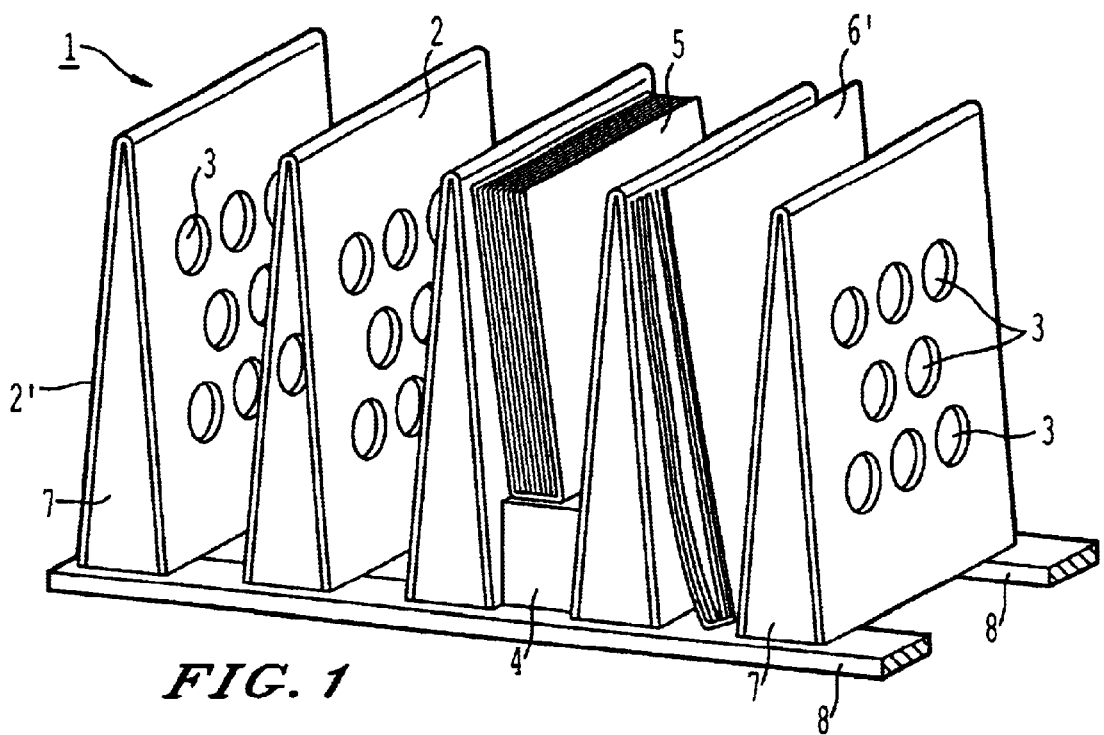
FIG. 1 shows a receiver for printed matter which can be fanned out.

FIG. 1 hows a receiver 1 in the form of a stand for printed matter, in particular books, brochures and the like. The stand has supporting ,parts 2' and 2 on the left and right-hand side respectively. These supporting parts comprise a plurality of openings 3 allowing the passage of air. Smaller books 5 are placed on a simple pedestal 4 so that their ends lie at the same height as other printed matter 6', in this case a brochure.

Figure 2:
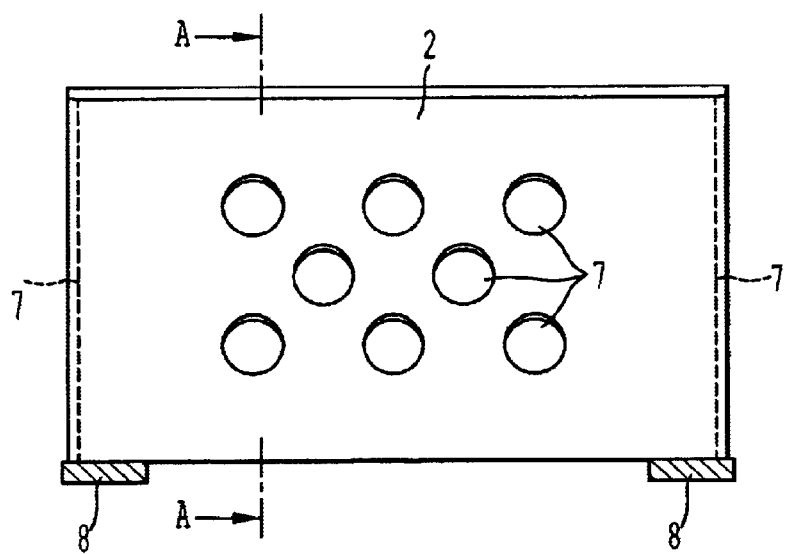
FIG. 2 shows a plan view of side parts of the receiver according to FIG. 1.
Figure 3:
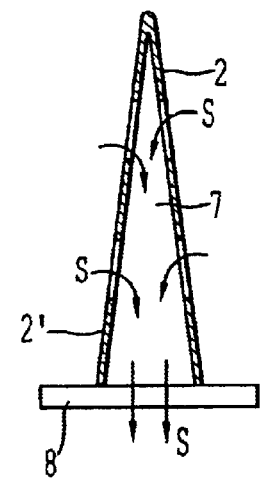
FIG. 3 shows a section through the side parts according to FIG. 2.

The supporting parts 2, 2' are provided at their ends with covers 7 and are fixed to mounting and transporting strips 8. The sectional view according to FIG. 3 shows the section A-A from FIG. 2. It can be seen from this how the flow S inside the supporting parts 2, 2' forms a channel flow and draws the book covers outwards and opens the book.

Figure 4:
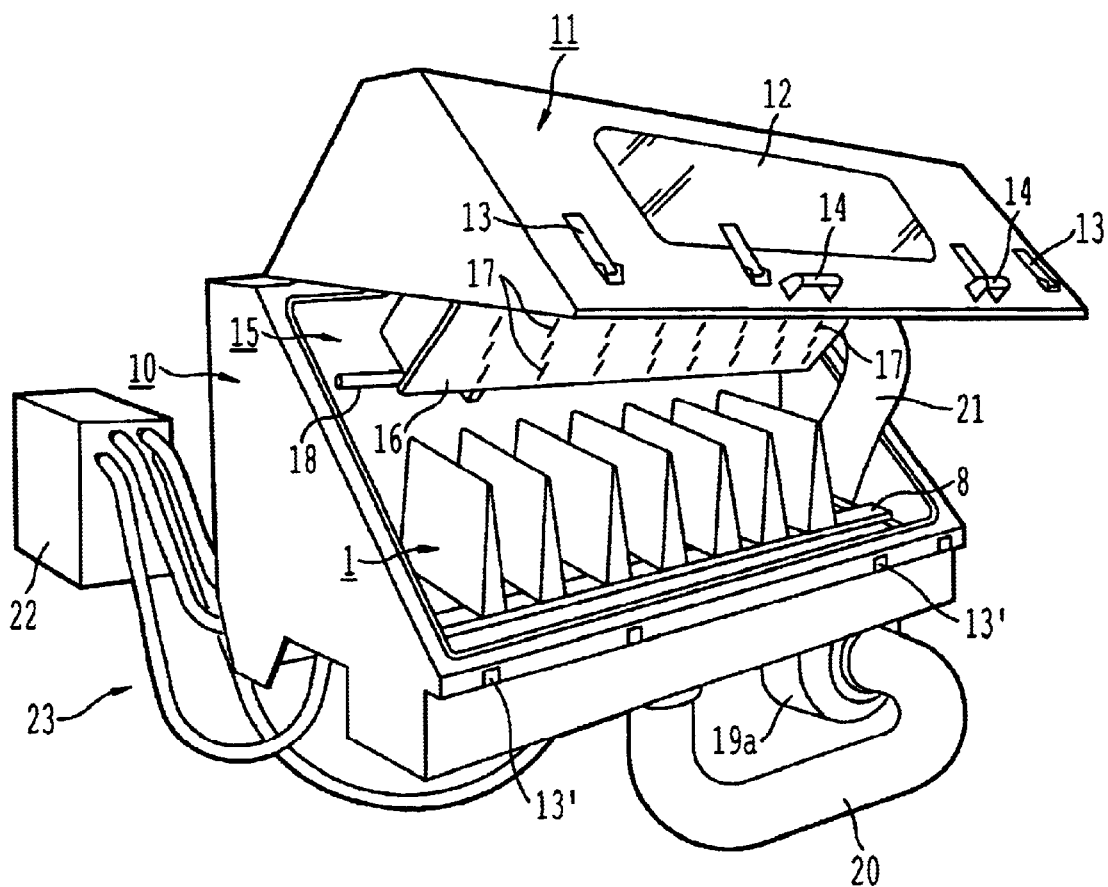
FIG. 4 shows an overall view of a device for deacidification, with open hinged cover.

The device according to FIG. 4 substantially comprises a closable case 10 provided with closing parts 13' and receiving the stand 1. The hinged cover of the case 10 is designated by 11 and, on its front side, comprises a viewing window 12, closing parts 13 and handles 14. A box-type air diffuser 15 with an outflow plate 16 for its part provided with air outlets 17 is displaceably fixed in the hinged cover 11. A sealed guide rod 18, which here projects beyond the end of the air diffuser 15, is provided for the longitudinal displacement of the air diffuser 15.

A low-pressure fan 19a is mounted below the case 10 and, via a large-volume suction tube 20 and an air-inlet tube 21 of the same type, sucks the air from the interior of the case 10 and supplies it again via the air diffuser 15 and the air outlets 17. A cooling unit 22 is additionally arranged outside the case 10 and is connected thereto via tubes 23.

Figure 5:
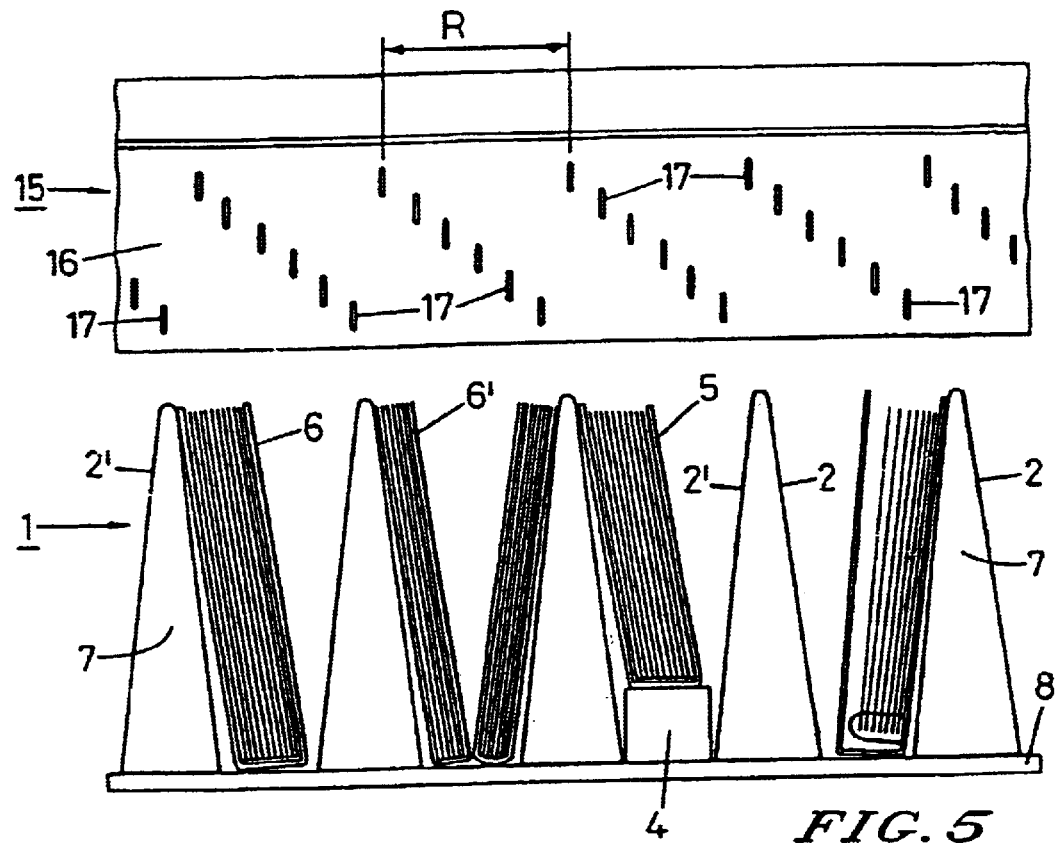
FIG. 5 shows enlarged details from FIG. 4, with books and files placed in the device.

In FIG. 5, the hinged cover 11 (not shown) is open and the position of the air diffuser 15 is shown accordingly. Here, the parallel, staggered air outlets 17 can be seen in plan view. The grid width of a row of parallel air outlets 17 in a staggered arrangement one behind the other is designated by R.

Figure 6:
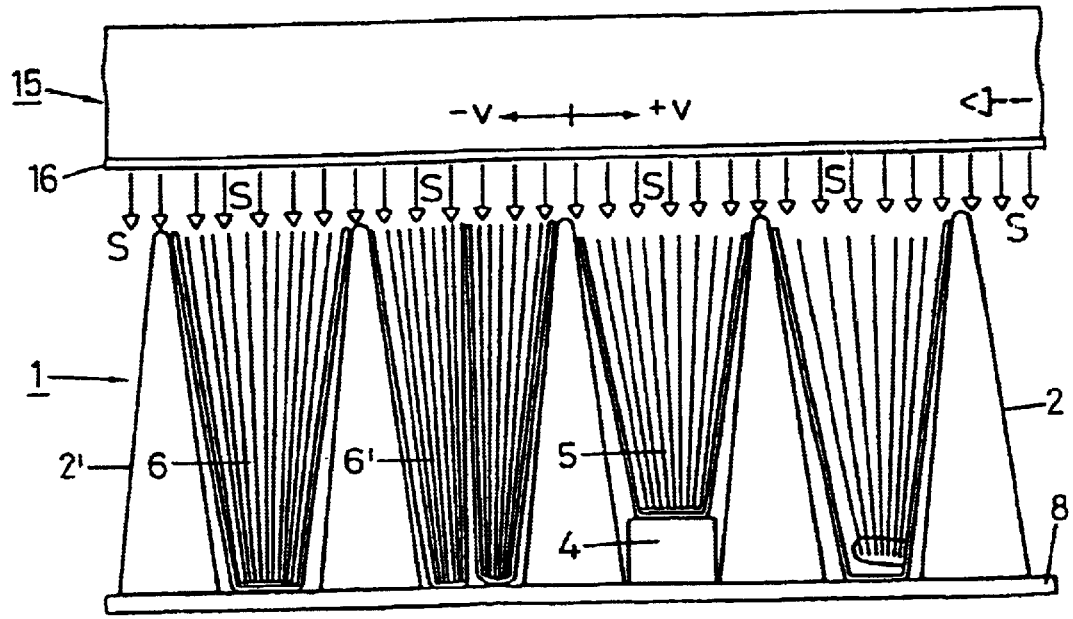
FIG. 6 shows parts of the device according to FIG. 5 in their operating position, demonstrating the leafing-through of the printed matter.

In FIG. 6, the hinged cover 11 is closed and the installation is in operation, during which the air diffuser 15 is moved back and forth at a constant rate by the amount R—cf. FIG. 5—characterised by +v and −v. The pages of the printed matter 5, 6, 6' are leafed through individually by the flow S and charged with active substance.

Figure 7:
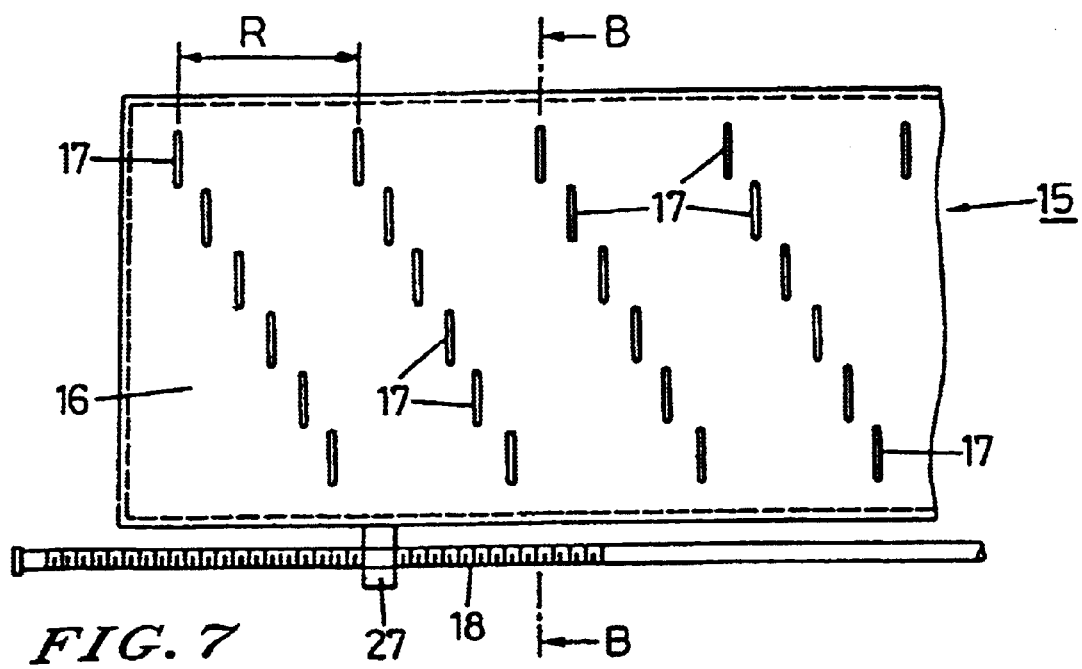
FIG. 7 shows an enlarged view of the air supply arrangement according to FIGS. 4 to 6.

FIG. 7 shows, as a further detail, the guide rod 18 with its slide bush 27, which is additionally protected from soiling by the active substance by means of an expansion bellows (not shown).

Figure 8:
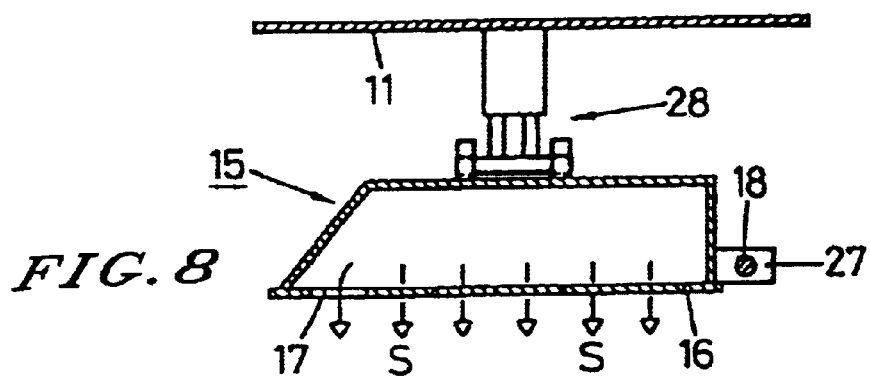
FIG. 8 shows a part sectional view of the air supply arrangement according to FIG. 7.

The sectional view in FIG. 8 corresponds to the section B-B indicated in FIG. 7 and shows more precisely the box-type structure of the air diffuser 15. The latter is fixed to the hinged cover 11 via a suspension/guide 28 and is closed by the outflow plate 16 provided with the air outlets 17.

Figure 9:
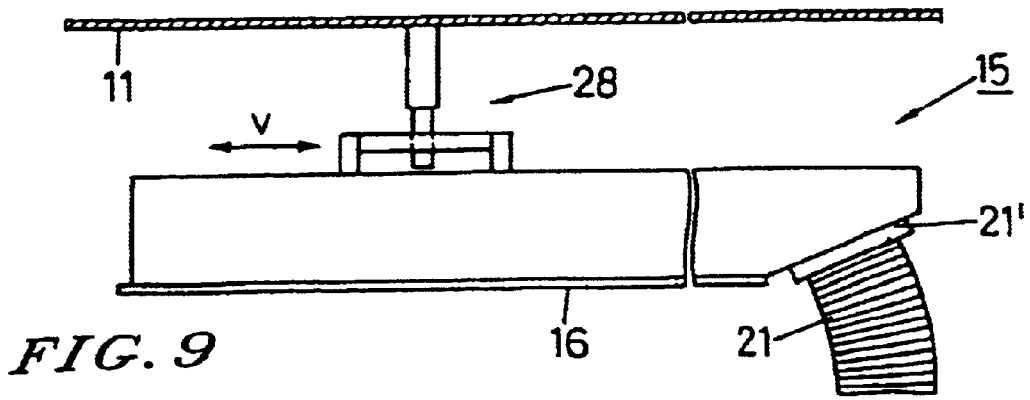
FIG. 9 shows a plan view of the air supply arrangement according to FIG. 8 rotated through 90°.

FIG. 9 shows the direction of movement v of the box 15 and also, on the right-hand side, the flexible air-inlet tube 21 with its connecting piece 21'.

Figure 10:
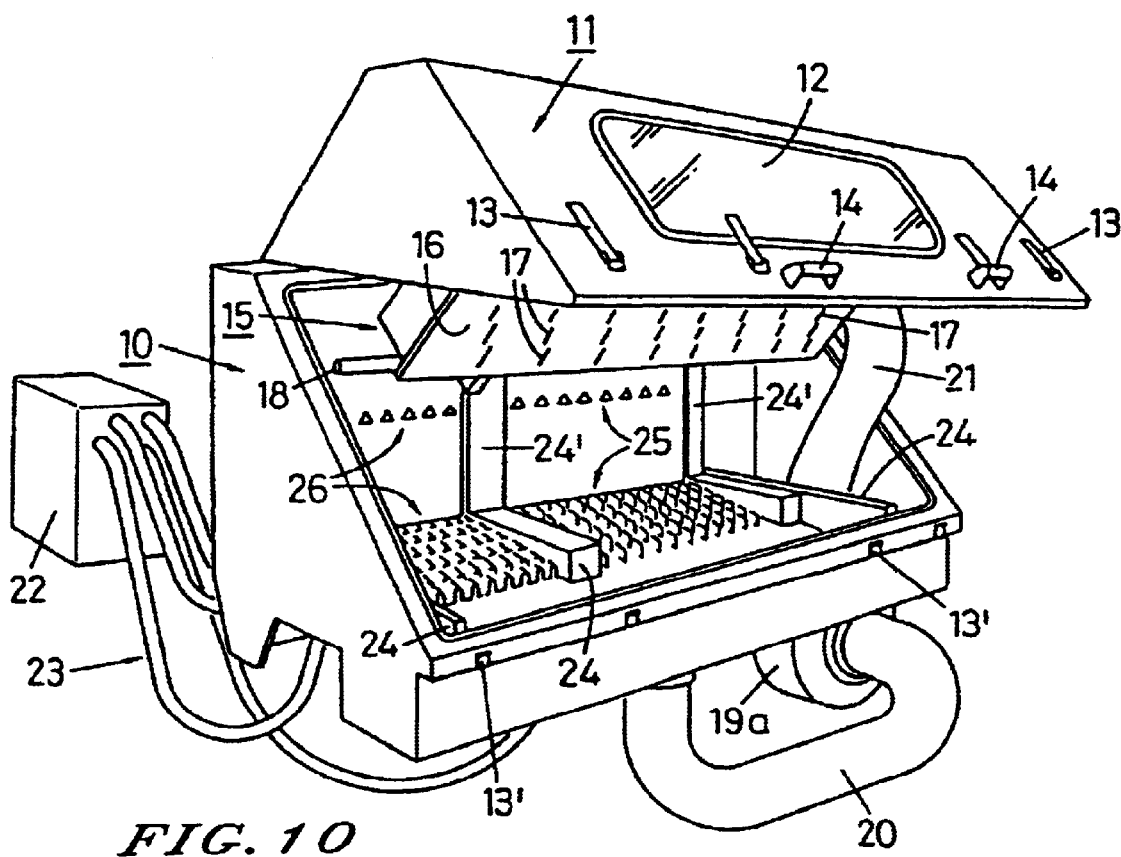
FIG. 10 shows the view according to FIG. 4 with the receiver removed.

In FIG. 10, the same details can be seen as in FIG. 4, only in this case the receiver 1 has been removed to reveal supporting brackets 24, 24' and cooling fins/deflectors 25 and heating fins 26 with deflectors.

Figure 11:
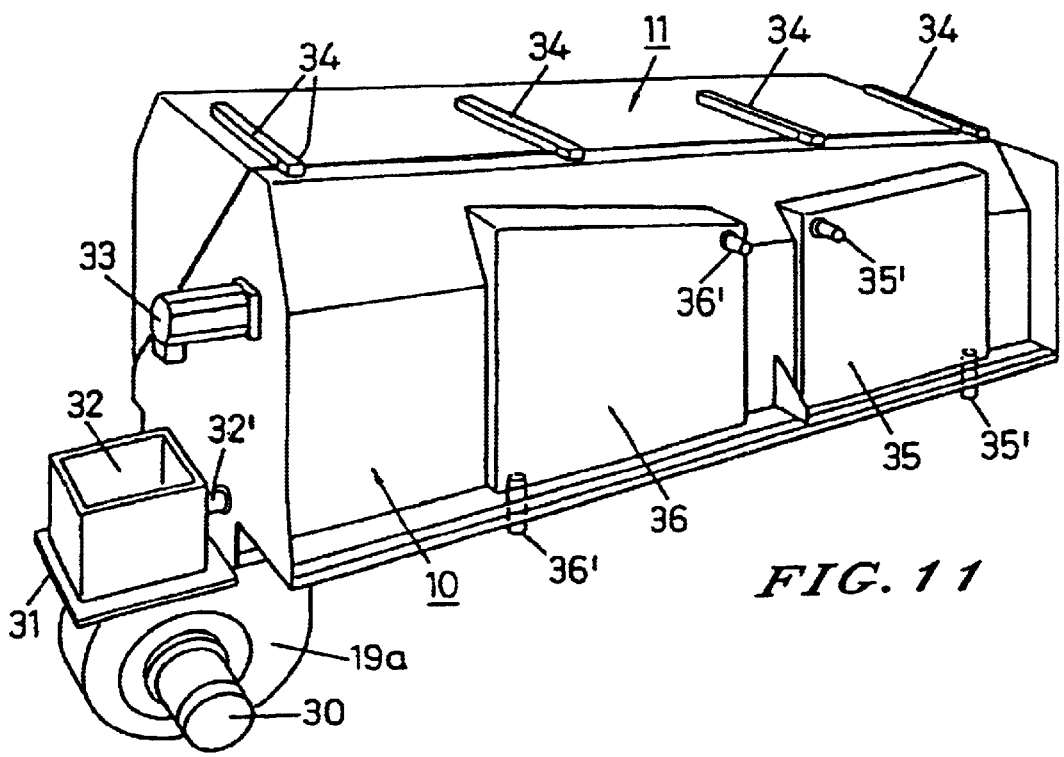
FIG. 11 shows the device according to FIGS. 4 and 10 viewed from behind and with the hinged cover closed.

As shown in FIG. 11, the rear of the device has a hot-water reservoir 35 and a cooling-fluid reservoir 36 provided with corresponding connections 35' and 36' and connected to the tubes 23 shown in FIG. 10. The low-pressure fan 19a with its drive, being an electric motor 30, and a screw conveyor 32 mounted on a carrier plate 31 and provided with a powder inlet 32' can also be seen here. A geared motor 33, which provides the linear drive of the air diffuser 15, is arranged thereabove—cf. FIGS. 6 and 7. Upper hinges 34 for opening the hinged cover 11 can also be seen.

Figure 12:
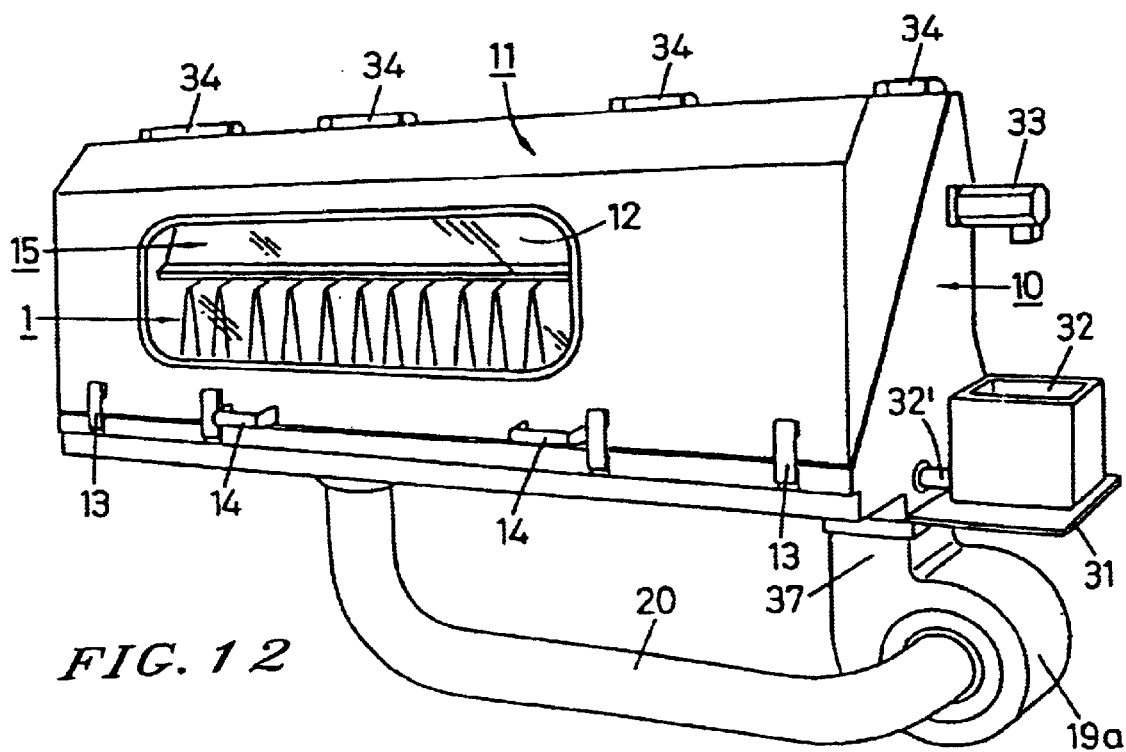
FIG. 12 shows the device with the hinged cover closed and viewed from the front.

The device is shown in the operational state in FIG. 12, the closing parts 13 hermetically sealing the box-type interior. The pressure connection 37 to the case 10 can also be seen here.

The schematic diagram in FIG. 13 again shows the case 10 with its reciprocating air diffuser 15 and the accommodated stand 1. A main flow H, accelerated by a low-pressure fan 19a, sucks air from the bottom of the case 10 and feeds it back into the latter via the air diffuser 15. The powder inlet 32' of the rotating screw conveyer 32, which is charged with the active substance designated by K, opens into the main flow H.

On completion of a treatment process, the fan 19a is switched off and a further low-pressure fan 19b in a secondary flow $N_0$ is switched on, which extracts the powdered active substance K from the air stream via a filter 38 and feeds it into a collecting container 40 via an outlet 39. The purified secondary flow is designated by $N_0'$.

Figure 13:
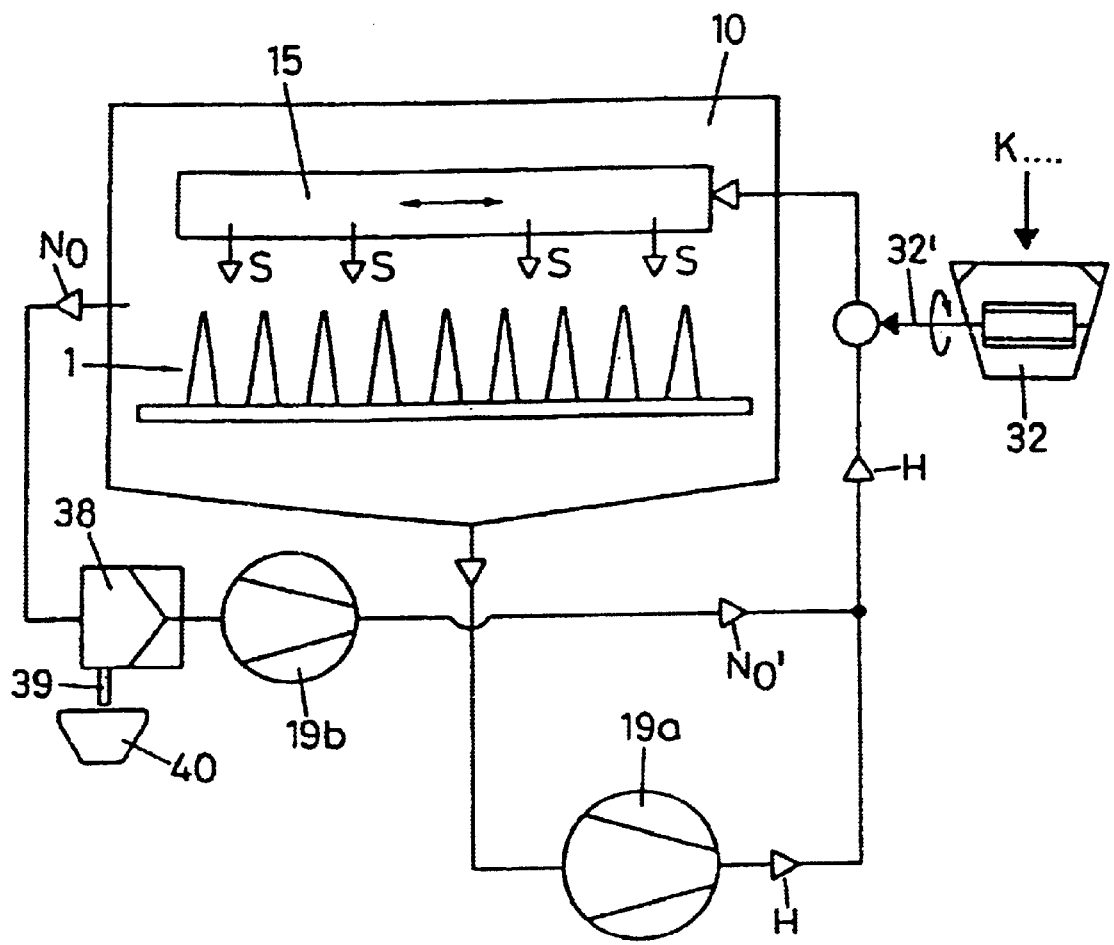
FIG. 13 shows a simplified pneumatic diagram of the overall installation.
Figure 14:
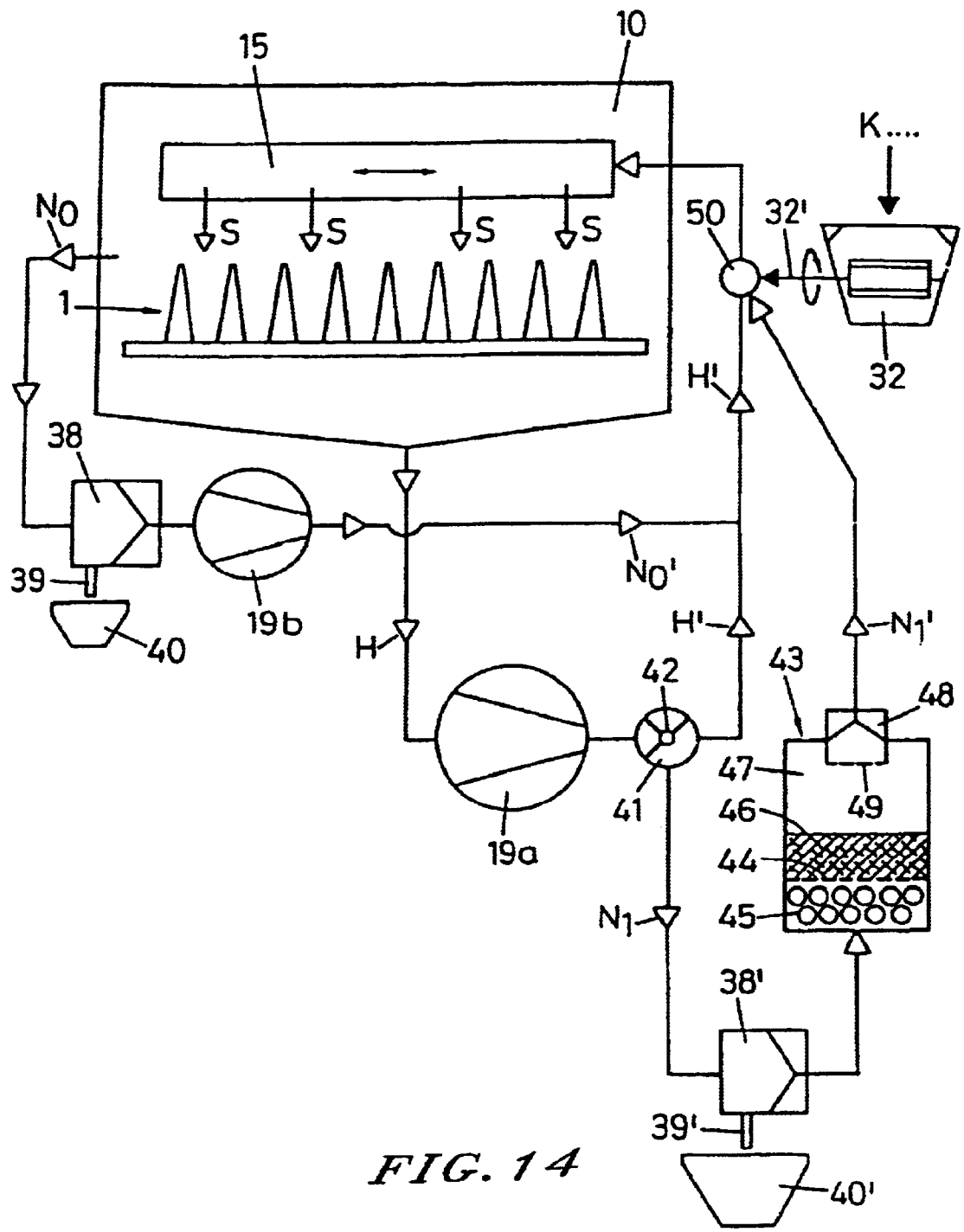
FIG. 14 shows an extended, simplified pneumatic diagram.

The installation in FIG. 14, which has been extended in relation to FIG. 13, comprises, in addition to FIG. 13, a three-way valve 41 which divides the main flow H into a main flow H' and a secondary flow $N_1$. The secondary flow $N_1$ is fed via a further filter 38' with outlet 39' and collecting container 40' to a dehumidifying chamber 43 comprising a carrier sieve 44, spherical air diffusers 45 arranged below the sieve 44 and dehumidifying material 46 arranged above the sieve 44. The collecting chamber 47 thereabove comprises a filter 48 having a sieve inlet 49 and supplies a dehumidified secondary flow $N_1'$ to a mixing nozzle 50 formed as a two-component ejector. The nozzle 50 feeds the active substance K into the air diffuser 15 by means of the dehumidified secondary flow $N_1'$.

The three-way valve 41 is centrally connected to an adjusting member 42 permitting continuously variable division of the main flow H' and the secondary flow $N_1$.

The active substances K can be inexpensively and very simply prepared by repeatedly grinding the components together and then drying them.

Mixture 1

90% $KHCO_3$ with 10% $K_2CO_3$, adjusted to a residual moisture content of 10% to 15% by weight, imparts a pH of 9.0 to 9.5 to the treated paper after average treatment time.

Mixture 2

99% $KHCO_3$ with 1% $K_2CO_3$, adjusted to a residual moisture content of approximately 10% by weight, imparts a pH of 8.2 to 8.5 to the treated paper.

Mixture 3

99.9% $KHCO_3$ with 0.1% $K_2CO_3$, adjusted to a residual moisture content of approximately 10% by weight, imparts a pH of 7.2 to 7.5 to the treated paper.

It has been shown that the residual moisture in the mixtures increases very rapidly when stored for a few days at room temperature, in particular in the case of mixture 1.

To improve the flowability or conveyability of the active substance in the installation, it is advisable to mix in an electrostatically active substance, for example in the form of polystyrene balls with a diameter of less than 2 mm.

For preparation of the components, the following has proved successful:

rough mixing of the main components $KHCO_3$ and $K_2CO_3$ addition of optional further components, for example potassium hydrogen phosphate or ammonium thiocyanate grinding of the mixture in a standard pinned-disc mill in at least two passes light drying of the mixture in a circulating-air drying cupboard at a maximum of 50° C. for 12 h in a layer thickness of 5 mm packing in air-tight and moisture-tight material.

Process

The printed matter 5, 6 and 6' to be treated is inserted into the stand 1 with the spine facing downwards and placed and sealed in the case 10. During a period of 15 to 30 minutes, the main flow H is fed through the low-pressure fan 19a via the air diffusor 15 and the printed matter is dried as necessary at room temperature or a slightly higher temperature until it loses approximately 0.5% to 2% of its intrinsic weight. During this process, the printed matter—usually books—is completely leafed through while the air diffuser 15 moves back and forth in a linear, saw-toothed manner, covering the distance R; cf. FIG. 7.

Active substance K—selected according to the pH to be obtained—is now fed into the main flow H via the screw conveyor 32. The mass of active substance K required is dependent on the mass of printed matter and amounts to approximately 5% of the mass of the latter. Homogeneous distribution of the active substance on the paper is ensured by the turbulent air circulation in the case 10. After a treatment period of 10 to 15 minutes, excess material is removed from the printed matter by switching off the main flow H and switching on the secondary flow $N_0$ and the printed matter can be removed substantially dust-free.

The active substance K can be used repeatedly and must be restored to its predetermined mass before each treatment. By renewed grinding and drying, the active substance can also be recirculated and the desired moisture content can be re-established.

In certain instances, it can be advantageous to remoisten, i.e. recondition the printed matter after treatment with the active substance K. The easiest way of doing this is in a cross-flow container which is fitted with an ultrasonic atomiser and generates a moist air stream.

Quality features

The treatment is distinguished by complete deacidification of the printed matter and applies a detectable alkaline reserve thereto. The deposition of this reserve amounts on average to 0.5% of the weight of the paper. There is no reaction with the paper matrix or the type and printing, i.e. there are no thermal effects and no variation in print quality to be observed. There are no toxicologically harmful deposits and no unpleasant odours imparted to the printed matter. There is no discoloration and no permanent dusty deposits, not even on high-gloss printed pages. The spine of the book remains mechanically sound, irrespective of the type of binding. Treatment quality does not depend on the number of pages; this has been verified with books from 30 to 1000 pages. The size of the printed matter is also unimportant with respect to treatment quality and/or type.

Analysis of printed matter comprising different weights of paper

| Quality criterion | Open paper 50 g/m$^2$ | Open paper 80 g/m$^2$ | Coated paper 80 g/m$^2$ | Coated paper 120 g/m$^2$ |
|---|---|---|---|---|
| Complete deacidication | achieved | achieved | achieved | achieved |
| Deposited alkaline reserve | up to 2% CaCO$_3$ | up to 1.2% CaCO$_3$ | 0.4% to 0.6% CaCO$_3$ | 0.3% to 0.4% CaCO$_3$ |
| No detectable reaction with paper and print | achieved | achieved | achieved | achieved |
| No toxicologically harmful deposits | achieved | achieved | achieved | achieved |
| No unpleasant odours | achieved | achieved | achieved | achieved |
| No discoloration | achieved | achieved | achieved | achieved |
| No dusty deposits (permanent) | achieved | achieved | achieved | achieved |
| No effect on bindings | achieved | achieved | achieved | achieved |

Processing Capacity

Using the previously described testing installation, the following treatment times were measured:

| Process parameter | Duration [minutes] Treatment programme Standard | Duration [minutes] Treatment programme Short |
|---|---|---|
| Loading | 3' | 3' |
| Drying | 30' | 15' |
| Charging | 15' | 10' |
| Dust-removal | 5' | 5' |
| Unloading | 3' | 3' |
| Purifying | 3' | 3' |
| Total duration = cadence | 59' | 39' |

On the basis of an installation availability of 19 days per month and a load per batch of 20 kg of books, between 35 t and 58 t of books can be permanently deacidified per year depending on the programme selected.

The use of a chemical dehumidifying chamber 43 is particularly economical in smaller installations. In this case, it is sufficient to feed the secondary flow $N_1$ from an oil-free compressor (residual moisture content RH 15% at 25° C.) into a 30 cm high drying chamber with a 300 cm$^2$ base and filled with silica gel 3 cm to 5 cm in height. The resulting moisture level in the secondary flow $N_1$' is 3% RH. In larger installations, the secondary flow $N_1$ is preferably branched off from the main flow H and also chemically dehumidified; cf. FIG. 14.

In large installations, it is advisable to provide a separate cooling unit with air circulation provided by a cyclone separator so that the necessary dehumidification and optional subsequent heating can be carried out outside the case 10, without the danger of corrosion and icing.

Naturally, in the sense of a kinematic reversal, it is also possible for the receiver for the printed matter to be moved and the flat jets to be employed in a stationary manner.

Further components can also be added to the active substance; for example these can be substances with strongly hygroscopic properties and a suitable pH, such as potassium hydrogen phosphate and ammonium thiocyanate. This type of mixture appears to improve the deposition of the alkaline reserve, in particular in the case of highly coated high gloss papers.

The subject of the invention is distinguished by a high level of economy. Both the active substance and the installation are very cost-effective to provide and maintain.

For large-scale applications—in large libraries, etc.—the subject of the invention can be set up for a high operational capacity through the agency of "industrial handling" and be substantially automated.

The installation can be transported easily and can be used in situ, for example in archives and libraries, so that unnecessary and, in addition, risky transportation of valuable printed matter does not have to take place.

What is claimed is:

1. A device for the deacidification of printed matter, by means of air streams laden with alkaline active substances in a receiver having supporting part for the insertion of printed matter, wherein laden air streams are conveyed via an air diffuser comprising an outflow plate and air outlets which emerge as flat jets, the printed matter is acted upon by at least two of these parallel, staggered flat jets, and the flat jets are at least substantially parallel to the lateral supporting parts and are displaceable relative thereto in a plane in such a manner that a staggered row of parallel flat jets covers the printed matter completely and uniformly and deposits particles of the active substance in the printed matter, the air diffuser is box-shaped, and the air diffuser is arranged in a horizontal plane and is laterally displaceable (+v, −v) above the supporting parts.

2. The device according to claim 1, wherein the air diffuser is arranged above the supporting parts and wherein the supporting part together with their base frame are laterally displaceable in a horizontal plane.

3. The device according to claim 1, further comprising a fan which circulates the laden air stream in a main flow.

4. A device for the deacidification of printed matter, by means of air streams laden with alkaline active substances in a receiver having supporting part for the insertion of printed matter, wherein laden air streams are conveyed via an air diffuser comprising an outflow plate and air outlets which emerge as flat jets, the printed matter is acted upon by at least two of these parallel, staggered flat jets, and the flat jets are at least substantially parallel to the lateral supporting parts and are displaceable relative thereto in a plane in such a manner that a staggered row of parallel flat jets covers the printed matter completely and uniformly and deposits particles of the active substance in the printed matter, and the device comprises a fan which circulates the laden air stream in a main flow and a further fan which conveys a portion of the laden air stream via a filter in a secondary flow and removes the active substance therefrom.

5. A device for the deacidification of printed matter, by means of air streams laden with alkaline active substances in a receiver having supporting part for the insertion of printed matter, wherein laden air streams are conveyed via an air diffuser comprising an outflow plate and air outlets which emerge as flat jets, the printed matter is acted upon by at least two of these parallel, staggered flat jets, and the flat jets are at least substantially parallel to the lateral supporting parts and are displaceable relative thereto in a plane in such a manner that a staggered row of parallel flat jets covers the printed matter completely and uniformly and deposits particles of the active substance in the printed matter, and a portion of the laden air stream is conveyed in a secondary flow via a filter and via a dehumidifying chamber.

6. The device according to claim 5, wherein the secondary flow is fed into the main flow.

7. A device for the deacidification of printed matter, by means of air streams laden with alkaline active substances in a receiver having supporting part for the insertion of printed matter, wherein laden air streams are conveyed via an air diffuser comprising an outflow plate and air outlets which emerge as flat jets, the printed matter is acted upon by at least two of these parallel, staggered flat jets, and the flat jets are at least substantially parallel to the lateral supporting parts and are displaceable relative thereto in a plane in such a manner that a staggered row of parallel flat jets covers the printed matter completely and uniformly and deposits particles of the active substance in the printed matter, and the device comprises a powder inlet wherein the powder inlet opens into a secondary flow a portion of a mixing nozzle.

8. A device for the deacidification of printed matter, by means of air streams laden with alkaline active substances in a receiver having supporting part for the insertion of printed matter, wherein laden air streams are conveyed via an air diffuser comprising an outflow plate and air outlets which emerge as flat jets, the printed matter is acted upon by at least two of these parallel, staggered flat jets, and the flat jets are at least substantially parallel to the lateral supporting parts and are displaceable relative thereto in a plane in such a manner that a staggered row of parallel flat jets covers the printed matter completely and uniformly and deposits particles of the active substance in the printed matter, the device is connected to a thermal dehumidifying and heating system.

9. The device according to claim 1, wherein said printed matter can be fanned out.

10. The device according to claim 1, wherein said printed matter is a bound book.

11. The device according to claim 1, further comprising a pluraliity of auxiliary units wherein the device is arranged in a case having tightly closable hinged cover including a plurality of feed and discharge lines connected to said auxiliary units.

12. The device according to claim 4, wherein said printed matter can be fanned out.

13. The device according to claim 4, wherein said printed matter is a bound book.

14. The device according to claim 4, further comprising a pluraliity of auxiliary units wherein, the device is arranged in a case having tightly closable hinged cover including a plurality of feed and discharge lines connected to said auxiliary units.

15. The device according to claim 5, further comprising a fan which circulates the laden air stream in a main flow.

16. The device according to claim 5, wherein said printed matter can be fanned out.

17. The device according to claim 5, wherein said printed matter is a bound book.

18. The device according to claim 5, further comprising a pluraliity of auxiliary units wherein the device is arranged in a case having tightly closable hinged cover including a plurality of feed and discharge lines connected to said auxiliary units.

19. The device according to claim 7, further comprising a fan which circulates the laden air stream in a main flow.

20. The device according to claim 7, wherein said printed matter can be fanned out.

21. The device according to claim 7, wherein said printed matter is a bound book.

22. The device according to claim 7, further comprising a pluraliity of auxiliary units wherein the device is arranged in a case having tightly closable hinged cover including a plurality of feed and discharge lines connected to said auxiliary units.

23. The device according to claim 8, further comprising a fan which circulates the laden air stream in a main flow.

24. The device according to claim 8, wherein said printed matter can be fanned out.

25. The device according to claim 8, wherein said printed matter is a bound book.

26. The device according to claim 8, further comprising a pluraliity of auxiliary units wherein the device is arranged in a case having tightly closable hinged cover including a plurality of feed and discharge lines connected to said auxiliary units.

* * * * *